No. 774,172.

Patented November 8, 1904.

UNITED STATES PATENT OFFICE.

WILLIAM E. GARRIGUES, OF NEW YORK, N. Y.

PROCESS OF RECOVERING GLYCERIN FROM SPENT SOAP-LYES.

SPECIFICATION forming part of Letters Patent No. 774,172, dated November 8, 1904.

Application filed February 25, 1904. Serial No. 195,223. (No specimens.)

*To all whom it may concern:*

Be it known that I, WILLIAM E. GARRIGUES, a citizen of the United States of America, and a resident of New York, in the county and State of New York, have invented certain new and useful Improvements in Processes of Recovering Glycerin from Spent Soap-Lyes, of which the following is a specification.

This invention has reference to a novel process of recovering glycerin from spent soap-lye, and pertains particularly to a process of eliminating soluble and volatile fatty acids from the raw material, so as to avoid contamination of the glycerin therewith. The raw material from which the glycerin is recovered is the waste lye from soap factories. When the soap solution is grained with salt, then the soap forms at the top of the kettle, while the waste lye settles at the bottom. This waste lye consists, essentially, of water, glycerin, the salt used for graining the soap, sulfate of sodium, carbonate of sodium, the excess of sodium hydroxid employed in the process, some soap, and alkali salts of soluble and volatile fatty acids. These latter acids are present in certain proportions in all animal and vegetable fats.

As is well known, soap is usually manufactured from fats and caustic alkalies. The fats are the triglycerids of the fatty acids, and when these are treated with caustic alkalies then the alkali salts of the fatty acids or the soaps are formed, while glycerin is set free, which settles at the bottom with the other components constituting the waste lye. As the fats are the triglycerids, it is apparent that considerable quantities of glycerin are found in the waste lye and commercially recovered therefrom.

The object of the present invention is to provide an improved process for recovering glycerin from said waste lye in a relatively pure condition. To attain this desirable object, I eliminate practically all the fatty acids previous to distillation and render the remaining solution alkaline before distilling.

In carrying out my novel process I substantially proceed as follows: The carbonate of sodium and the sodium hydroxid contained in the spent lye are first neutralized by a mineral acid, preferably sulfuric acid. The insoluble fatty acids are then in solution in form of alkaline salts. They are precipitated by double decomposition with a solution of a metallic salt, which produces insoluble compounds. Sulfate of aluminium is preferably used, whereby the insoluble aluminium salt of the fatty acid is formed or, as it may be termed, the "insoluble aluminium soap." The precipitate and the remaining liquid are now separated by filtration. The soluble fatty acids remain in solution as alkali salts and pass down into the filtrate. After having thus separated out the insoluble fatty acids the filtrate is reduced by evaporation, preferably in a vacuum-evaporator, until the remaining liquid contains between twenty-five and forty per cent. of glycerin. During this operation about eight-tenths of all the dissolved sulfate and chlorid of sodium crystallize out. The remaining liquid is separated from the crystallized salts by filtration or by centrifugal force. Barium chlorid is now added, whereby sulfate of barium is precipitated by double decomposition with the sulfates still present in the liquid at this stage of the process. The barium chlorid further produces a precipitate of barium soaps from the insoluble fatty acids still present in the liquid in form of soluble alkali soaps. Now enough sulfuric or other mineral acid is added to the liquid to combine with the greater part or all of the alkali in combination with the volatile fatty acids. Thus the volatile fatty acids are set at liberty. A portion of the volatile fatty acids becomes insoluble by this treatment. This is due to the present concentration of the liquid as compared with the original spent lye. These precipitated fatty acids are enveloped by the sulfate of barium formed in the liquid. This facilitates the filtration of the liquid, which now follows, whereby the liquid and the precipitate are separated. As described, the sulfuric acid is only added after the sulfate of barium has been produced in the liquid, and in practice the excess of sulfuric acid added is not sufficient to decompose the barium soaps already precipitated. The remaining liquid is again submitted to evaporation, preferably in a vacuum-evaporator. This evaporation is continued until the liquid contains between seventy and ninety per cent. of glycerin. During this operation a further crystallization of chlorid and sulfate of sodium takes place. At the same time the greater part of the volatile fatty acids is carried off with the water-vapors. Thus the greater part of the volatile fatty acids is eliminated previous to the distillation. The term "volatile fatty acids" is here applied as is used among chemists to mean such fatty acids which vaporize with water-vapors at a temperature not exceeding 212° Fahrenheit. These include acetic, butyric, caprylic, &c., acids. As the glycerin becomes more concentrated in the remaining liquid by the evaporation, a combination takes place between some glycerin and part of the remaining volatile fatty acids. Hereby the glycerids of those acids are produced which are presumably identical with the glycerids contained in the original fats, from which latter they were extracted during the process of making soap. Therefore it is not feasible to eliminate all the volatile fatty acids present during one evaporation. The next step in the process is to distil off the glycerin. At the high temperature necessary for doing this the glycerids of the volatile fatty acids contained in the liquid would be again decomposed into free fatty acids and glycerin. Both would distil, and some glycerids would also distil unchanged. To avoid contamination of the distillate with the acids or glycerids, both of which are objectionable, sufficient carbonated or caustic alkali or an alkaline earth is added to the contents of the still. Preferably carbonate of sodium is used. This combines with all the fatty acids present no matter whether they exist in the free state or in combination as glycerids. Now the liquid is submitted to distillation, the glycerin passing over and the fatty acids being retained in the still with some remaining salts. This is the case because the fatty acids are bound by the alkali and are now probably in their original condition in which they existed in the spent lye. The distillation is continued until practically all the glycerin has been distilled, the residuum in the still consisting, essentially, of sulfate and chlorid of sodium, the alkaline salts of the fatty acids just mentioned, and some coloring-matter from the fats, together with a small quantity of glycerin. This residue is so small that it may be discarded, or, if deemed advisable to save the salts and the small amount of glycerin, it may be added to a fresh supply of spent lye and again put through the process.

The insoluble fatty acids combined with alkali and in solution as alkali salts instead of being separated out by the use of sulfate of aluminium may also be rendered insoluble by the addition of sufficient mineral acid, whereby said insoluble acids will be set free. This would save the trouble and expense of forming aluminium soap; but unfortunately the free fatty acids present a mechanical difficulty during filtration, because they are sticky and soon clog the pores of the filtering medium. For this reason the formation of an insoluble soap is preferable, because it permits of quick filtration.

Instead of producing sulfate of barium in the liquid by the addition of chlorid of barium for the purpose of enveloping the fatty acids, as above described, I may add directly some insoluble and indifferent substance—for instance, sulfate of barium, as found in the market. This will also produce a granular covering on the fatty acids which may be separated at the next stage of the process, due to the more concentrated condition of the liquid. This would be done for easing the filtering operation which follows, so as to prevent a closing of the pores of the filtering medium. However, chlorid of barium presents the advantage of forming the insoluble soaps above mentioned by double decomposition with any soluble alkali soaps still present if these have not been completely decomposed in the earlier stages of the process by having used an insufficient quantity of sulfate of aluminium or mineral acid in the first treatment of the lye.

Theoretically considered the elimination of volatile fatty acids may be brought about if in the first treatment the spent lye is made acid to such an extent that the volatile fatty acids are set free instead of doing this later in the partly-concentrated liquid. These would then pass over with the water-vapor during the subsequent evaporation of the liquid. This plan is open to physical objection, because the dilute liquid will froth violently during the evaporation if it contains free volatile fatty acids. However, this does not take place if the acid condition of the liquid is produced after same has become more viscid due to a greater percentage of glycerin therein after evaporating. Furthermore, the bulk of dilute liquid to be handled would be so great that it would not be easy to get the required conditions which are easily obtained when a small quantity of more concentrated liquid is to be treated. In addition thereto the spent lyes contain some fatty acids which are sparingly soluble in water, but not readily volatile with water-vapor. If the dilute liquid is acidified, then these fatty acids pass into the filtrate by virtue of the relatively large amount of water present in the dilute lye. If, on the contrary, a small bulk of concentrated liquid is acidified, then these acids are largely precipitated and removed in the second filtration. The barium chlorid above mentioned is mainly added for the purpose of enveloping these fatty acids with sulfate of barium. The free fatty acids are less soluble in water than their barium salts.

I am aware that the treatment of spent lyes with sulfuric acid and sulfate of aluminium or chlorid of barium has long been practiced, also that the method of boiling liquid in the presence of sufficient sulfuric acid to displace volatile fatty acids from their combination with alkali is well known to the art, besides being self-evident. My improved process consists of the sequence of the various steps, certain concentrations, and the addition of alkali previous to distilling, by means of which I obtain better results than heretofore possible. Heretofore the method commonly practiced was to precipitate the insoluble fatty acids from their alkali combinations in the spent lye with sulfate of aluminium or chlorid of barium. Then the liquid was nearly neutralized with sulfuric acid, leaving same somewhat alkaline. Evaporation followed until the liquid contained more than seventy per cent. of glycerin. After separating the deposited chlorid and sulfate of sodium the liquid was distilled. As the operation was conducted with an alkaline liquid from the beginning, it is obvious that the volatile fatty acids from the fats originally used to produce the spent lye were all still retained. After distillation the residue, consisting of the volatile acid salts, &c., was either discarded or heated to the boiling-point with enough sulfuric acid to set free the volatile fatty acids, which were then driven off with the water-vapor.

It must be observed that my process largely eliminates the volatile fatty acids before the liquid is distilled. Thus I have in the still a very small amount of volatile fatty acids in comparison to the quantity of glycerin present. As these volatile fatty acids are partly distilled with the glycerin even from an alkaline liquid and as the larger the quantity in the still the more of them are distilled, it is apparent that my process greatly reduces the amount of fatty acids found in the distilled glycerin. Tests made therewith proved this to be the case. In addition to this advantage my process further increases the distilling capacity of a given distilling apparatus. The rate of distillation is materially retarded by the presence of the alkali salts of the volatile fatty acids in the liquid to be distilled. Furthermore, it is impossible to completely separate the glycerin from the alkali salts of the volatile fatty acids. Some of the fatty acids pass over to the distillate, and, on the other hand, some glycerin is retained by the salts in the residue. The glycerin thus retained increases in mathematical proportion to the quantity of the salts of the volatile fatty acids in the still. By eliminating the volatile fatty acids almost entirely in my improved process previous to distilling the glycerin I produce a residue so low in volatile fatty-acid salts that the glycerin retained by them is trifling, and the residue may be economically discarded. The residues resulting from methods formerly practiced contained so much glycerin that they could not be economically discarded and the glycerin had to be recovered therefrom by mixing it with fresh raw material. In some instances the residue contained fifty per cent. of glycerin, which could not be distilled off conveniently, while I am able to distil off practically all the glycerin. There are also in the market residues from evaporations of soap-lyes, from which the insoluble fatty acids, chlorids, and sulfates have been largely separated. These may likewise be treated by my improved process. In this case water is first added to the liquid, and the diluted liquid thus obtained is then treated with acid or chlorid of barium and acid. The precipitate formed thereby is separated from the remaining liquid, the water and volatile acids evaporated, the residue made alkaline, as above described, and the glycerin distilled off.

Having thus described my invention, I claim as new and desire to secure by Letters Patent—

1. The process of recovering glycerin from spent soap-lye consisting in first neutralizing the liquid by a mineral acid, separating out the insoluble fatty acids, concentrating the remaining liquid, separating the mineral salts, removing then the volatile fatty acids previous to distilling, adding alkaline substance, and distilling off the glycerin.

2. The process of recovering glycerin from spent soap-lye consisting in first neutralizing the liquid by a mineral acid, separating out the insoluble fatty acids, concentrating the remaining liquid, separating the mineral salts, concentrating again by evaporation and carrying off thereby the volatile fatty acids, adding alkaline substance, and distilling off the glycerin.

3. The process of recovering glycerin from spent soap-lye consisting in first neutralizing the liquid by a mineral acid, separating out the insoluble fatty acids, concentrating the remaining liquid, separating the mineral salts, setting free the volatile fatty acids and removing same partly by filtration and partly by evaporation previous to distilling, adding alkaline substance, and distilling off the glycerin.

4. The process of recovering glycerin from spent soap-lye consisting in first neutralizing the liquid by a mineral acid, separating out the insoluble fatty acids, concentrating the remaining liquid, separating the mineral salts from the concentrated liquid, producing then an indifferent precipitate in the solution, setting free the volatile fatty acids, filtering off the volatile fatty acids and the indifferent precipitate enveloping them, evaporating off the water and volatile fatty acids previous to distilling, adding alkaline substance, and distilling off the glycerin.

5. The process of recovering glycerin from spent soap-lye consisting in first neutralizing the liquid by sulfuric acid, precipitating the insoluble fatty acids by sulfate of aluminium, removing the aluminium soaps by filtration, concentrating the remaining liquid, separating the mineral salts, removing then the volatile fatty acids previous to distilling, adding alkaline substance, and distilling off the glycerin.

6. The process of recovering glycerin from spent soap-lye consisting in first neutralizing the liquid by sulfuric acid, precipitating the insoluble fatty acids by sulfate of aluminium, removing the aluminium soaps by filtration, concentrating the remaining liquid by evaporation, separating the mineral salts, producing then sulfate of barium in the solution, setting free the volatile fatty acids and removing same partly by filtration and partly by evaporation with the water-vapors previous to distilling, adding alkaline substance, and distilling off the glycerin.

7. The process of recovering glycerin from spent soap-lye consisting in first neutralizing the liquid by sulfuric acid, precipitating the insoluble fatty acids by sulfate of aluminium, removing the aluminium soaps by filtration, concentrating the remaining liquid, by evaporation, separating the mineral salts, adding chlorid of barium to produce sulfate of barium and barium soaps, adding then mineral acids to set free the volatile fatty acids partly in an insoluble condition in the partly-concentrated liquid, filtering off the precipitate, removing now the water and the rest of the volatile fatty acids by evaporation, adding alkaline substance, and distilling off the glycerin.

8. The process of recovering glycerin from spent soap-lye consisting in first neutralizing the liquid by sulfuric acid, precipitating the insoluble fatty acids by sulfate of aluminium, removing the aluminium soaps by filtration, concentrating the remaining liquid by evaporation, separating the mineral salts, adding chlorid of barium producing thereby sulfate of barium and barium soaps, adding then enough sulfuric acid to combine with the greater part of the alkali in combination with the volatile fatty acids, setting them free thereby partly in an insoluble condition in the partly-concentrated liquid, separating same by filtration enveloped by the sulfate of barium, freeing then the remaining liquid from the water and the rest of the volatile fatty acids by evaporation in a vacuum-evaporator previous to distilling, adding alkaline substance, and distilling off the glycerin.

9. The process of recovering glycerin from spent soap-lye consisting in first neutralizing the liquid by sulfuric acid, precipitating the insoluble fatty acids by sulfate of aluminium, removing the aluminium soaps by filtration, concentrating the remaining liquid by evaporation, separating the mineral salts, adding chlorid of barium producing thereby sulfate of barium and barium soaps, adding then enough sulfuric acid to combine with the greater part of the alkali in combination with the volatile fatty acids, setting them free thereby partly in an insoluble condition in the partly-concentrated liquid, separating same by filtration enveloped by the sulfate of barium, freeing then the remaining liquid from water and the rest of the volatile fatty acids by evaporation in a vacuum-evaporator previous to distilling, adding carbonate of sodium, and distilling off the glycerin.

10. The process of recovering glycerin from evaporations of soap-lye from which insoluble fatty acids, chlorids and sulfates have been largely separated, consisting in first diluting the liquid with water, adding chlorid of barium, then adding mineral acid, separating the precipitates formed, removing the water and volatile fatty acids by evaporation, adding alkaline substance, and distilling off the glycerin.

11. The process of recovering glycerin from evaporations of soap-lyes from which insoluble fatty acids, chlorids and sulfates have been largely separated, consisting in first diluting the liquid with water, adding chlorid of barium, then adding sulfuric acid, separating the precipitates formed, removing the water and volatile fatty acids by evaporation, adding carbonate of sodium, and distilling off the glycerin.

Signed at New York, N. Y., this 23d day of February, 1904.

WILLIAM E. GARRIGUES.

Witnesses:
NICHOLAS CELIA,
HATTIE B. LUEDERS.